United States Patent
Pheiffer (12)

(10) Patent No.: US 6,290,211 B1
(45) Date of Patent: Sep. 18, 2001

(54) GARDENING TOOL

(76) Inventor: Nicolaas G. Pheiffer, G1 River PL Mews Nightinggale Way Pinelands, Capetown 7405 (ZA)

(*) Notice: Subject to any disclaimer, the term of this patent is extended or adjusted under 35 U.S.C. 154(b) by 0 days.

(21) Appl. No.: 09/705,639

(22) Filed: Nov. 3, 2000

(51) Int. Cl.⁷ .................................................. B66F 3/00
(52) U.S. Cl. ....................... 254/132; 254/131.5; 254/131
(58) Field of Search ................................... 254/132, 131, 254/131.5, 120

(56) References Cited

U.S. PATENT DOCUMENTS

| | | | |
|---|---|---|---|
| 15,628 | * | 8/1856 | Woolson ............................ 254/132 |
| D. 300,760 | | 4/1989 | Krokus, Sr. . |
| 654,001 | * | 7/1900 | Hull ................................. 254/131 |
| 1,245,920 | * | 11/1917 | Hinthorn ........................... 254/132 |
| 2,349,621 | * | 5/1944 | Hardman ........................... 254/132 |
| 3,061,270 | | 10/1962 | Lowe . |
| 3,152,788 | | 10/1964 | Hardwidge . |
| 4,180,289 | | 12/1979 | Faine . |
| 4,537,433 | * | 8/1985 | Yang ............................... 254/131.5 |
| 4,822,088 | | 4/1989 | Price . |
| 5,615,541 | | 4/1997 | Ota . |
| 5,667,651 | * | 9/1997 | Vroegindewey .................. 254/132 |

* cited by examiner

Primary Examiner—Joseph J. Hail, III
Assistant Examiner—Lee Wilson

(57) ABSTRACT

A gardening tool for pulling weeds and other digging work. The gardening tool includes a rod. The rod is elongate and has a first end and a second end. The first end has a well extending therein. The rod has a hole extending therethrough. The hole is positioned generally adjacent to the first end and extending through the well. At least one head has a first portion securely coupled to a second portion. The first portion comprises a cylinder, which is removably extendable in the well. The cylinder has an opening extending therethrough and orientated generally perpendicular to a longitudinal axis of the cylinder. A first of the heads has a second portion comprises a plate. The plate generally is in a plane orientated parallel to the longitudinal axis. A free end of the plate extends outwardly away from the first portion. Each of a plurality of spikes is integrally coupled to and extends away from the free end of the plate. A fastener for removably fastening the head to the rod is extended through the hole in the shaft and through the opening in the first portion when the first portion is extended into the well.

8 Claims, 3 Drawing Sheets

GARDENING TOOL

BACKGROUND OF THE INVENTION

1. Field of the Invention

The present invention relates to gardening tools and more particularly pertains to a new gardening tool for pulling weeds and other digging work.

2. Description of the Prior Art

The use of gardening tools is known in the prior art. More specifically, gardening tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,822,088; U.S. Pat. No. 5,615,451; U.S. Pat. No. 4,180,289; U.S. Des. Pat. No. 300,760; U.S. Pat. No. 3,061,270; and U.S. Pat. No. 2,152,788.

While these devices fulfill their respective, particular objectives and requirements, the aforementioned patents do not disclose a new gardening tool. The inventive device includes a rod. The rod is elongate and has a first end and a second end. The first end has a well extending therein. The rod has a hole extending therethrough. The hole is positioned generally adjacent to the first end and extending through the well. At least one head has a first portion securely coupled to a second portion. The first portion comprises a cylinder, which is removably extendable in the well. The cylinder has an opening extending therethrough and orientated generally perpendicular to a longitudinal axis of the cylinder. A first of the heads has a second portion comprises a plate. The plate generally is in a plane orientated parallel to the longitudinal axis. A free end of the plate extends outwardly away from the first portion. Each of a plurality of spikes is integrally coupled to and extends away from the free end of the plate. A fastener for removably fastening the head to the rod is extended through the hole in the shaft and through the opening in the first portion when the first portion is extended into the well.

In these respects, the gardening tool according to the present invention substantially departs from the conventional concepts and designs of the prior art, and in so doing provides an apparatus primarily developed for the purpose of pulling weeds and other digging work.

SUMMARY OF THE INVENTION

In view of the foregoing disadvantages inherent in the known types of gardening tools now present in the prior art, the present invention provides a new gardening tool construction wherein the same can be utilized for pulling weeds and other digging work.

The general purpose of the present invention, which will be described subsequently in greater detail, is to provide a new gardening tool apparatus and method which has many of the advantages of the gardening tools mentioned heretofore and many novel features that result in a new gardening tool which is not anticipated, rendered obvious, suggested, or even implied by any of the prior art gardening tools, either alone or in any combination thereof.

To attain this, the present invention generally comprises a rod. The rod is elongate and has a first end and a second end. The first end has a well extending therein. The rod has a hole extending therethrough. The hole is positioned generally adjacent to the first end and extending through the well. At least one head has a first portion securely coupled to a second portion. The first portion comprises a cylinder, which is removably extendable in the well. The cylinder has an opening extending therethrough and orientated generally perpendicular to a longitudinal axis of the cylinder. A first of the heads has a second portion comprises a plate. The plate generally is in a plane orientated parallel to the longitudinal axis. A free end of the plate extends outwardly away from the first portion. Each of a plurality of spikes is integrally coupled to and extends away from the free end of the plate. A fastener for removably fastening the head to the rod is extended through the hole in the shaft and through the opening in the first portion when the first portion is extended into the well.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gardening tool apparatus and method which has many of the advantages of the gardening tools mentioned heretofore and many novel features that result in a new gardening tool which is not anticipated, rendered obvious, suggested, or even implied by any of the prior art gardening tools, either alone or in any combination thereof.

It is another object of the present invention to provide a new gardening tool which may be easily and efficiently manufactured and marketed.

It is a further object of the present invention to provide a new gardening tool which is of a durable and reliable construction.

An even further object of the present invention is to provide a new gardening tool which is susceptible of a low cost of manufacture with regard to both materials and labor, and which accordingly is then susceptible of low prices of sale to the consuming public, thereby making such gardening tool economically available to the buying public.

Still yet another object of the present invention is to provide a new gardening tool which provides in the apparatuses and methods of the prior art some of the advantages thereof, while simultaneously overcoming some of the disadvantages normally associated therewith.

Still another object of the present invention is to provide a new gardening tool for pulling weeds and other digging work.

Yet another object of the present invention is to provide a new gardening tool which includes a rod. The rod is elongate and has a first end and a second end. The first end has a well extending therein. The rod has a hole extending therethrough. The hole is positioned generally adjacent to the first end and extending through the well. At least one head has a first portion securely coupled to a second portion. The first portion comprises a cylinder, which is removably extendable in the well. The cylinder has an opening extending therethrough and orientated generally perpendicular to a longitudinal axis of the cylinder. A first of the heads has a second portion comprises a plate. The plate generally is in a plane orientated parallel to the longitudinal axis. A free end of the plate extends outwardly away from the first portion. Each of a plurality of spikes is integrally coupled to and extends away from the free end of the plate. A fastener for removably fastening the head to the rod is extended through the hole in the shaft and through the opening in the first portion when the first portion is extended into the well.

Still yet another object of the present invention is to provide a new gardening tool that has interchangeable heads for providing a multi-purpose tool.

Even still another object of the present invention is to provide a new gardening tool that has a coupling member for pivotally coupling the heads to the rest of the tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
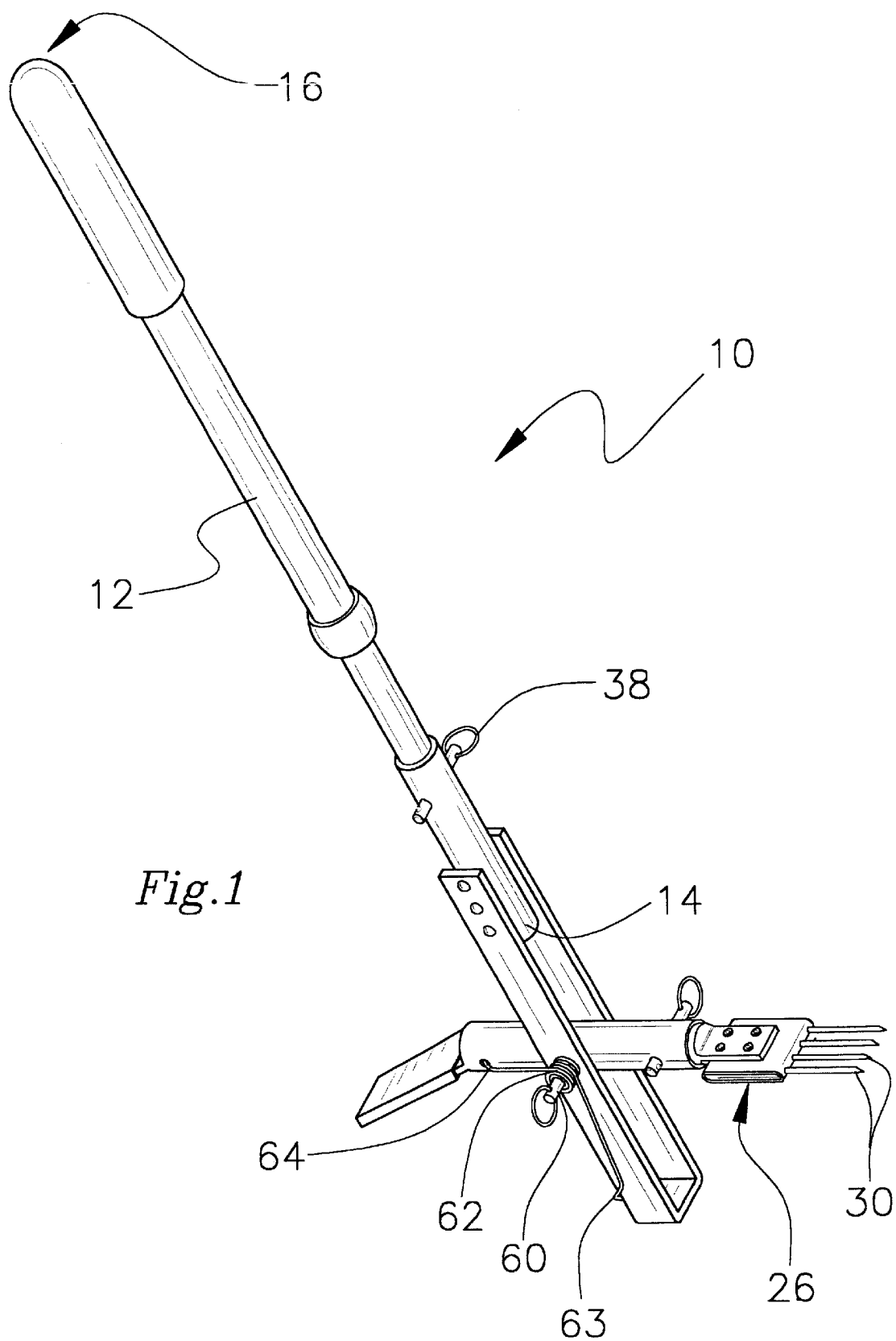
FIG. 1 is a schematic perspective view of a new gardening tool according to the present invention.
Figure 2:
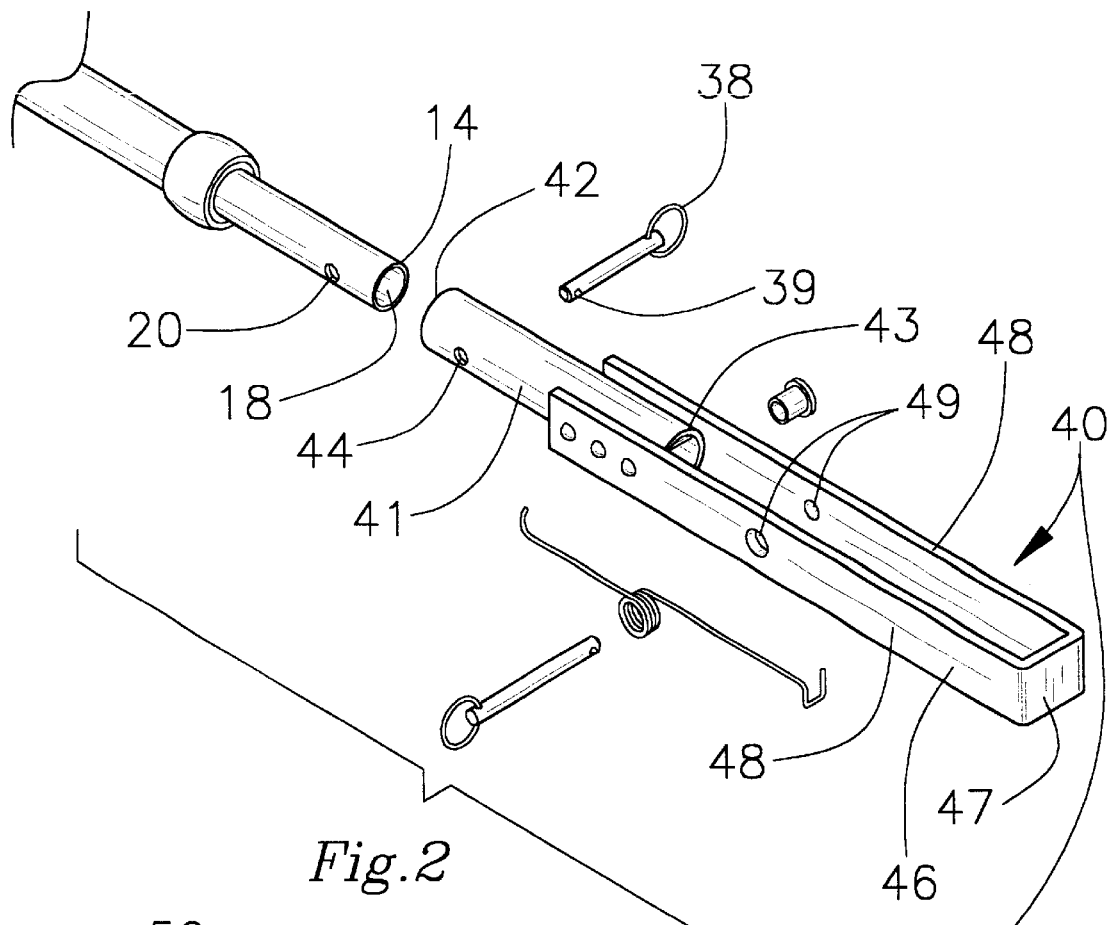
FIG. 2 is a schematic exploded perspective view of the coupling member of the present invention.
Figure 3:
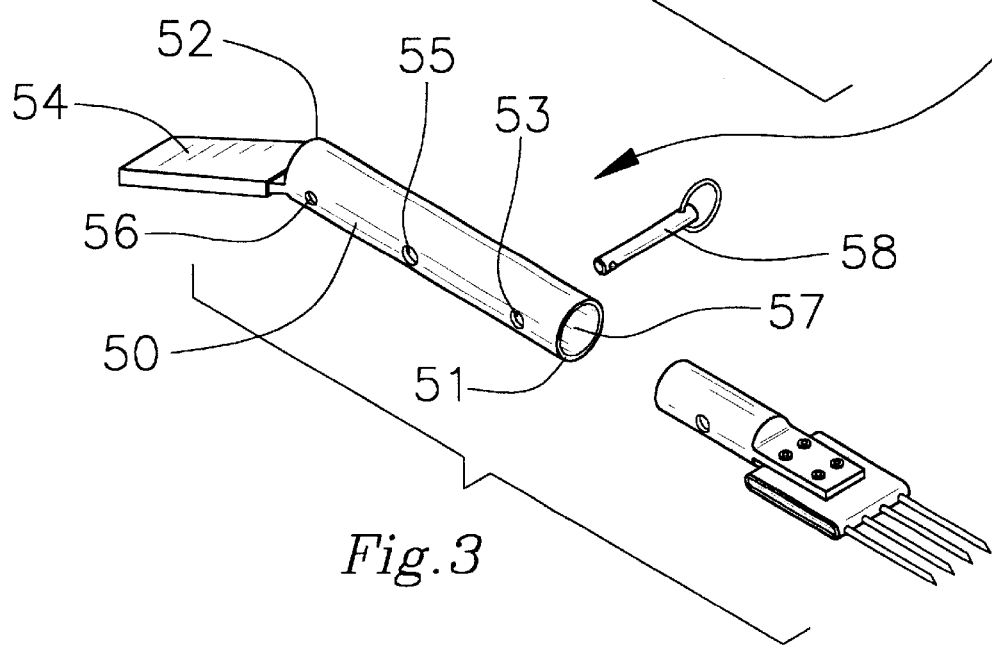
FIG. 3 is a schematic perspective view of the second shaft of the present invention.
Figure 4:
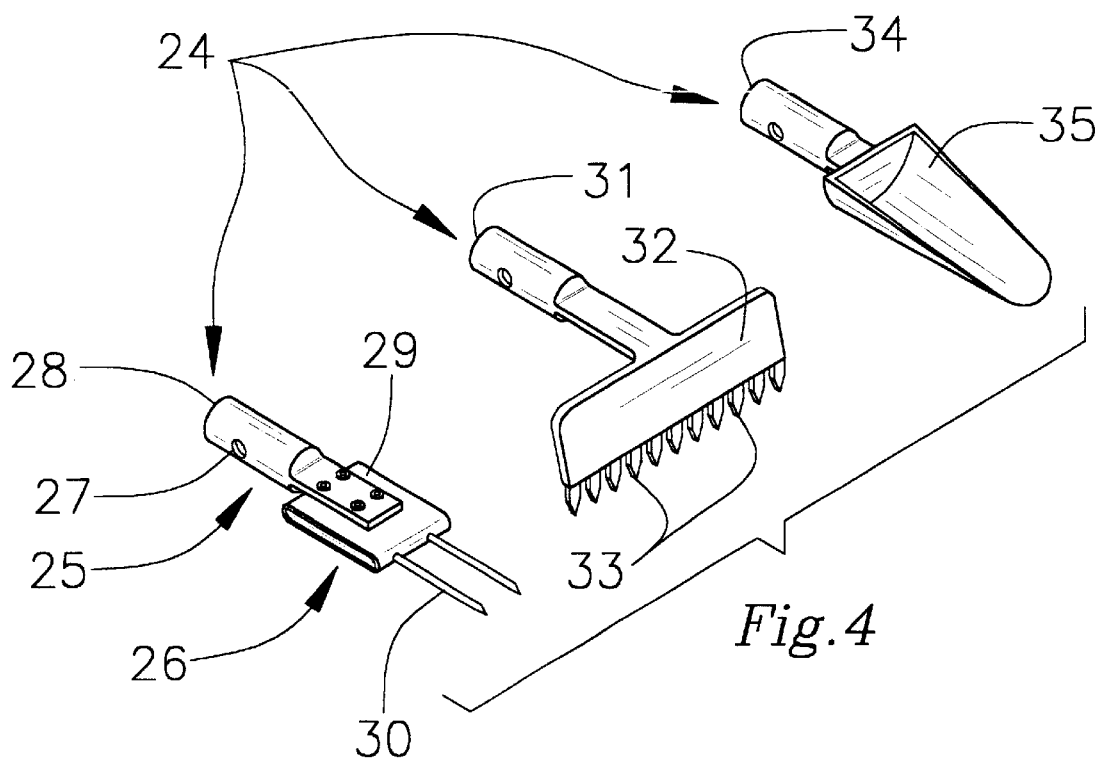
FIG. 4 is a schematic perspective view of the heads of the present invention.
Figure 5:
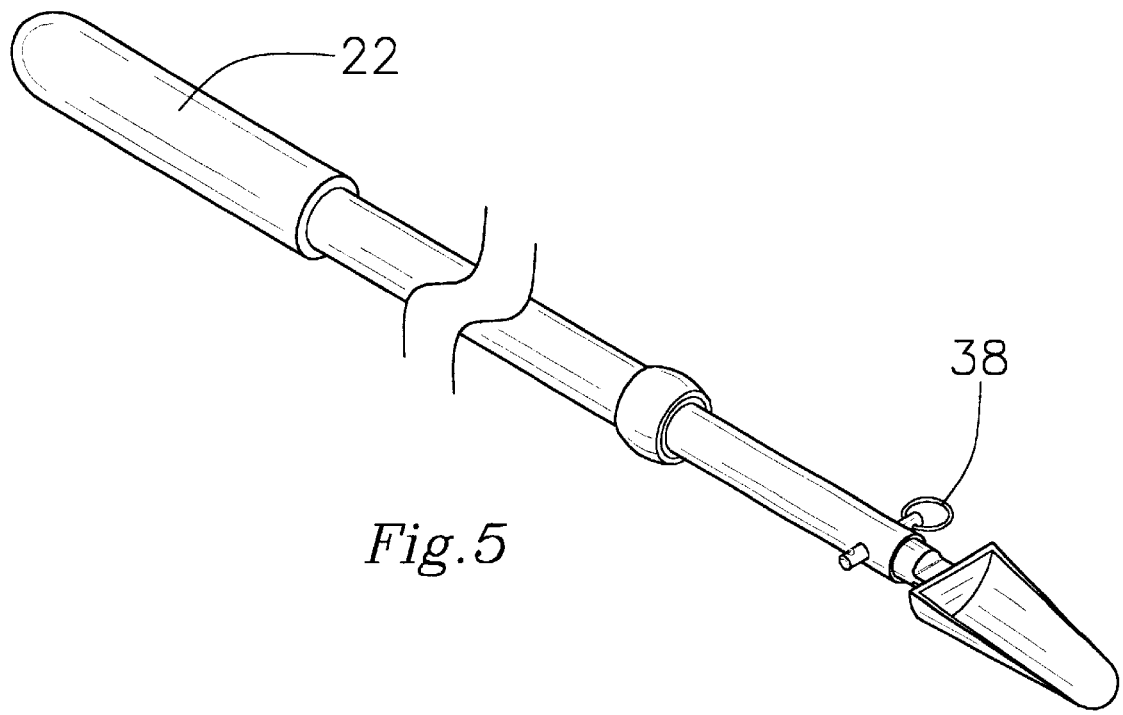
FIG. 5 is a schematic perspective view of the present invention.

With reference now to the drawings, and in particular to FIGS. 1 through 5 thereof, a new gardening tool embodying the principles and concepts of the present invention and generally designated by the reference numeral 10 will be described.

As best illustrated in FIGS. 1 through 5, the gardening tool 10 generally comprises a rod 12. The rod 12 is elongate and has a first end 14 and a second end 16. The first end 14 has a well 18 extending therein. The rod 12 has a hole 20 extending therethrough. The hole 20 is positioned generally adjacent to the first end 14 and extends through the well 18. The rod 12 preferably has a length generally between 3 and 5 feet. A handle portion 22 generally covers the second end 16 of the rod 12 and extends down a portion of the rod 12. The handle portion 22 is securely attached to the rod 12. The handle portion 22 preferably comprises a resiliently flexible material.

Each of a plurality of heads 24 has a first portion 25 securely coupled to a second portion 26. Each of the first portions 25 comprises a cylinder. Each of the cylinders, or first portions 25, is removably extendable in the well 18. Each of the cylinders has an opening 27 extending therethrough and orientated generally perpendicular to a longitudinal axis of the cylinder 25. A first 28 of the heads has a second portion comprising a plate 29. The plate 29 generally is in a plane orientated parallel to the longitudinal axis. A free end of the plate extends outwardly away from first portion 25. Each of a plurality of spikes 30 is integrally coupled to and extends away from the free end of the plate 29. A second 31 of the heads has a second portion comprising a wall 32 integrally coupled to the cylinder and orientated generally perpendicular to the longitudinal axis. The wall 32 has a free end having a plurality of spikes 33 integrally coupled thereto and extending away therefrom. A third 34 of the heads has a second portion comprising a scoop member 35 integrally coupled to the first portion 25.

A fastener 38 removably fastens one of the heads 24 to the rod 12. The fastener 38 is extended through the hole 20 in the shaft 12 and through the opening 27 in the first portion when the first portion 25 is extended into the well 18. The fastener 38 comprises a pin. The pin has a ball bearing 39 therein biased outwardly for keeping the pin in place.

A coupling assembly 40 pivotally couples one of the heads 24 to the rod 12. The coupling assembly 40 includes a first shaft 41. The first shaft 41 has a first end 42 and a second end 43. The first shaft 41 is generally hollow such that the first end 42 of the rod may be removably extended into the first end 14 of the first shaft 41. The first shaft 41 has an aperture 44 therethrough for receiving the fastener 38.

A bracket member 46 has a base 47 and two legs 48 integrally coupled thereto. The second end 43 of the first shaft 41 is positioned between the legs 48 and securely coupled to each of the legs 48. Each of the legs 48 has a hole 49 therein such that the holes 49 in the legs 48 are generally opposite of each other and positioned between a free end of the legs and the base 47.

A second shaft 50 has a first end 51 and a second end 52. The first end 51 has a bore 57 therein for removably receiving one of the cylinders 25. The second shaft 50 has a first hole 53 extending therethrough and positioned generally adjacent to the first end 51. The second end 52 has a plate 54 integrally coupled thereto and extending away therefrom and defining foot pedal. The second shaft 50 has a second hole 55 extending therethrough and positioned generally between the first 51 and second 52 ends of the second shaft. The second hole 55 has an axis orientated generally parallel to an axis of the first hole. A third hole 56 extends into the second shaft 50 and is positioned generally adjacent to the second end 52 of the second shaft.

A coupler 58 removably couples a head 24 to the second shaft 50. The coupler 58 is extendable through the first hole 53 in the second shaft 50 and through the opening 27 in one of the cylinders 25.

A spindle 60 is removably extendable through the holes 49 in the legs 49 and through the second hole 55 in the second shaft 50.

A biasing means 62 biases rotation of the second shaft 50 with respect to the bracket member 46 in a first direction. The biasing means 62 comprises a spring positionable around the spindle 62. The spring has a first end 63 biased against the bracket member and a second end 64 extended into the third hole 56.

In use, the tool may be used with or without the coupling assembly. If the coupling assembly is used, the second portion of the head is dug into the ground at a point adjacent to a weed to be removed. The foot pedal is stepped on to lift the weed out of the ground. The biasing means keeps the second shaft orientated nearly parallel to a longitudinal axis of the rod. The heads may be interchanged depending on the task to be performed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gardening tool device and accessories therefor, said device comprising:
   a rod, said rod being elongate and having a first end and a second end, said first end having a well extending, therein, said rod having a hole extending therethrough, said hole being positioned generally adjacent to said first end and extending through said well;
   at least one head, said head having a first portion securely coupled to a second portion, said first portion comprising a cylinder, said cylinder being removably extendable in said well said cylinder having an opening extending therethrough and orientated generally perpendicular to a longitudinal axis of said cylinder, a first of said heads having a second portion comprising a plate, said plate generally being in a plane orientated parallel to said longitudinal axis, a free end of said plate extending outwardly away from first portion, each of a plurality of spikes being integrally coupled to and extending away from said free end of said plate;
   a fastener for removably fastening said head to said rod, wherein said fastener is extended through said hole in said shaft and through said opening in said first portion when said first portion is extended into said well.

2. The gardening tool device as in claim 1, wherein said rod further includes:
   said rod having a length generally between 3 and 5 feet.

3. The gardening tool device as in claim 1, wherein said rod further includes:
   a handle portion generally covering said second end of said rod and extending down a portion of said rod, said handle portion being securely attached to said rod, said handle portion comprising a resiliently flexible material.

4. The gardening tool device as in claim 1, further including:
   a plurality of heads, each of said heads having said first portion and said second portion, each of said first portions comprising said cylinder, a second of said heads having a second portion comprising a wall integrally coupled to said cylinder and orientated generally perpendicular to said longitudinal axis, said wall having a free end having a plurality of spikes integrally coupled thereto and extending away therefrom.

5. The gardening tool device as in claim 4, further comprising:
   a third of said heads having a second portion comprising a scoop member integrally coupled to said first portion.

6. The gardening tool device as in claim 5, further including:
   a coupling assembly for pivotally coupling one of said heads to said rod, said coupling assembly comprising;
   a first shaft, said first shaft having a first end and a second end, said first shaft being generally hollow such that said first end of said shaft may be removably extended into said first end of said rod, said first shaft having an aperture therethrough for receiving said fastener;
   a bracket member, said bracket member having a base and two legs integrally coupled thereto, said second end of said first shaft being positioned between said legs and securely coupled to each of said legs, each of said legs having a hole therein such that said holes in said legs are generally opposite of each other and positioned between a free end of said legs and said base;
   a second shaft, said second shaft having a first end and a second end, said first end having a bore therein for removably receiving one of said cylinders, said second shaft having a first hole extending therethrough and positioned generally adjacent to said first end, said second end having a plate integrally coupled thereto and extending away therefrom, said second shaft having a second hole extending therethrough and positioned generally between said first and second ends of said second shaft, said second hole having an axis orientated generally parallel to an axis of said first hole, a third hole extending into said second shaft and being positioned generally adjacent to said second end of said second shaft;
   a coupler for removably coupling a head to said second shaft, wherein said coupler is extendable through said first hole in said second shaft and through said opening in one of said cylinders;
   a spindle, said spindle being removably extendable through said holes in said legs and through said second hole in said second shaft; and
   a biasing means for biasing rotation of said second shaft with respect to said bracket member in a first direction.

7. The gardening tool device as in claim 1, further including:
- a coupling assembly for pivotally coupling said head to said rod, said coupling assembly comprising;
  - a first shaft, said first shaft having a first end and a second end, said first shaft being generally hollow such that said first end of said shaft may be removably extended into said first end of said rod, said first shaft having an aperture therethrough for receiving said fastener;
  - a bracket member, said bracket member having a base and two legs, integrally coupled thereto, said second end of said first shaft being positioned between said legs and securely coupled to each of said legs, each of said legs having a hole therein such that said holes in said legs are generally opposite of each other and positioned between a free end of said legs and said base;
  - a second shaft, said second shaft having a first end and a second end, said first end having a bore therein for removably receiving said cylinder, said second shaft having a first hole extending therethrough and positioned generally adjacent to said first end, said second end having a plate integrally coupled thereto and extending away therefrom, said second shaft having a second hole extending therethrough and positioned generally between said first and second ends of said second shaft, said second hole having an axis orientated generally parallel to an axis of said first hole, a third hole extending into said second shaft and being positioned generally adjacent to said second end of said second shaft;
  - a coupler for removably coupling said head to said second shaft, wherein said coupler is extendable through said first hole in said second shaft and through said opening in said cylinder;
  - a spindle, said spindle being removably extendable through said holes in said legs and through said second hole in said second shaft; and
  - a biasing means for biasing rotation of said second shaft with respect to said bracket member in a first direction, said biasing means comprising a spring positionable around said spindle, said spring having a first end biased against said bracket member and a second end extended into said third hole.

8. A gardening tool device and accessories therefor, said device comprising:
- a rod, said rod being elongate and having a first end and a second end, said first end having a well extending therein, said rod having a hole extending therethrough, said hole being positioned generally adjacent to said first end and extending through said well, said rod having, a length generally between 3 and 5 feet, a handle portion generally covering said second end of said rod and extending down a portion of said rod, said handle portion being, securely attached to said rod, said handle portion comprising a resiliently flexible material;
- a plurality of heads, each of said heads having a first portion securely coupled to a second portion, each of said first portions comprising a cylinder, each of said cylinders being removably extendable in said well, each of said cylinders having an opening extending therethrough and orientated generally perpendicular to a longitudinal axis of said cylinder, a first of said heads having a second portion comprising a plate, said plate generally being in a plane orientated parallel to said longitudinal axis, a free end of said plate extending outwardly away from first portion, each of a plurality of spikes being integrally coupled to and extending away from said free end of said plate, a second of said heads having a second portion comprising a wall integrally coupled to said cylinder and orientated generally perpendicular to said longitudinal axis, said wall having a free end having a plurality of spikes integrally coupled thereto and extending away therefrom, a third of said heads having a second portion comprising a scoop member integrally coupled to said first portion;
- a fastener for removably fastening one of said heads to said rod, wherein said fastener is extended through said hole in said shaft and through said opening in said first portion when said first portion is extended into said well, said fastener comprising a pin;
- a coupling assembly for pivotally coupling one of said heads to said rod, said coupling assembly comprising;
  - a first shaft, said first shaft having a first end and a second end, said first shaft being generally hollow such that said first end of said shaft may be removably extended into said first end of said rod, said first shaft having an aperture therethrough for receiving said fastener;
  - a bracket member, said bracket member having a base and two legs integrally coupled thereto, said second end of said first shaft being positioned between said legs and securely coupled to each of said legs, each of said legs having a hole therein such that said holes in said legs are generally opposite of each other and positioned between a free end of said legs and said base;
  - a second shaft, said second shaft having a first end and a second end, said first end having a bore therein for removably receiving one of said cylinders, said second shaft having a first hole extending therethrough and positioned generally adjacent to said first end, said second end having a plate integrally coupled thereto and extending away therefrom, said second shaft having a second hole extending therethrough and positioned generally between said first and second ends of said second shaft, said second hole having an axis orientated generally parallel to an axis of said first hole, a third hole extending into said second shaft and being positioned generally adjacent to said second end of said second shaft;
  - a coupler for removably coupling a head to said second shaft, wherein said coupler is extendable through said first hole in said second shaft and through said opening in one of said cylinders,
  - a spindle, said spindle being removably extendable through said holes in said legs and through said second hole in said second shaft; and
  - a biasing means for biasing rotation of said second shaft with respect to said bracket member in a first direction, said biasing means comprising a spring positionable around said spindle, said spring having a first end biased against said bracket member and a second end extended into said third hole.

* * * * *